Figure 1:
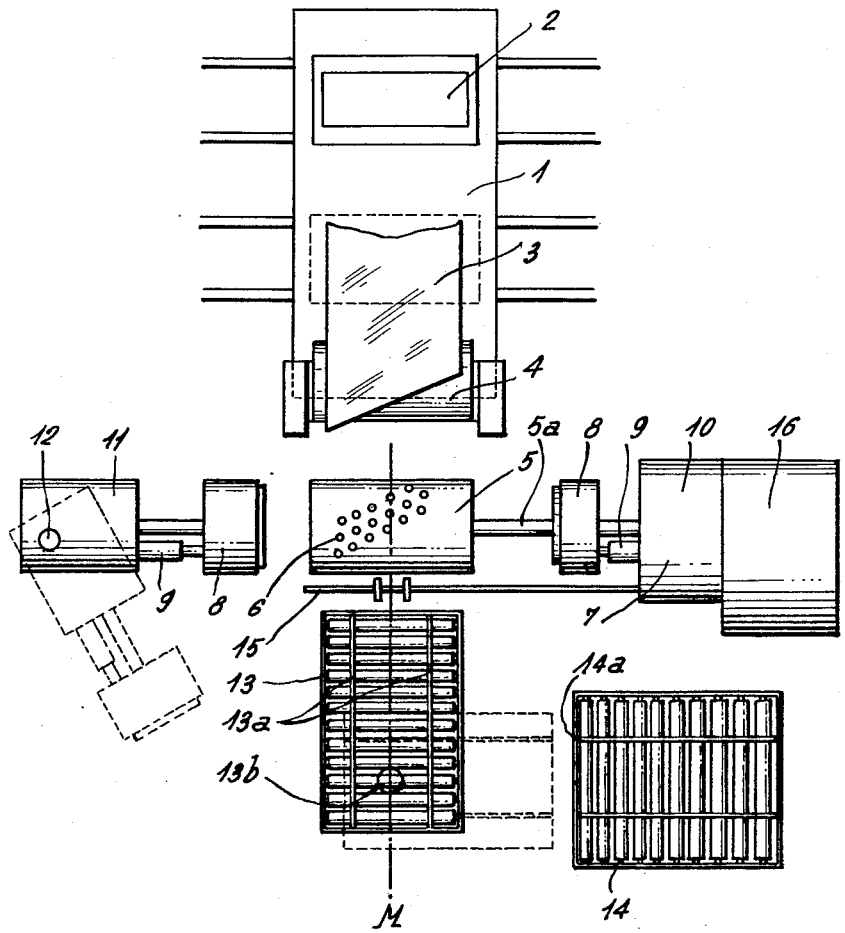

Dec. 12, 1961   N. NEBOUT   3,012,602
APPARATUS FOR THE MANUFACTURE OF PNEUMATIC TIRE CASINGS
Filed March 3, 1958   2 Sheets-Sheet 2
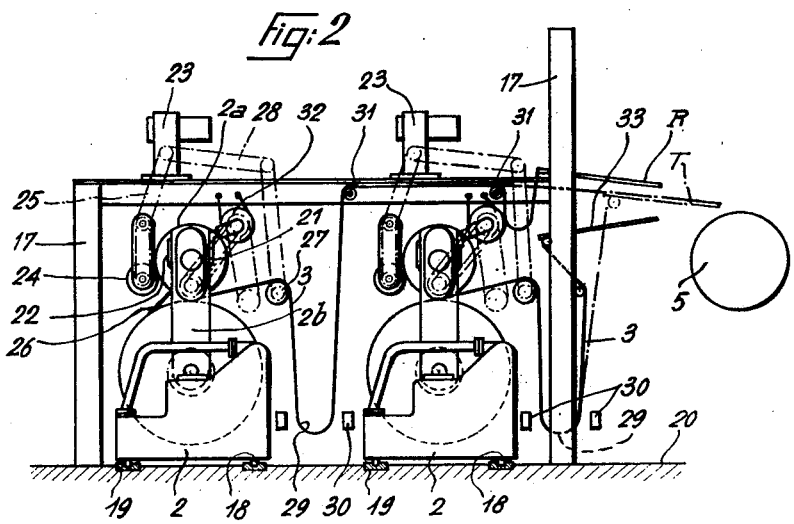
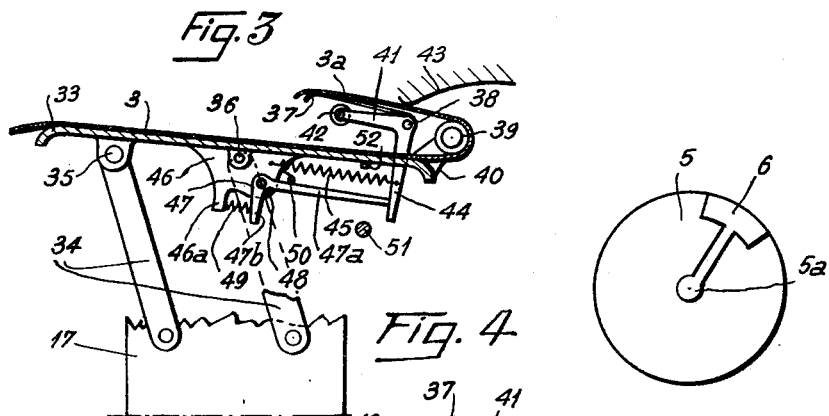
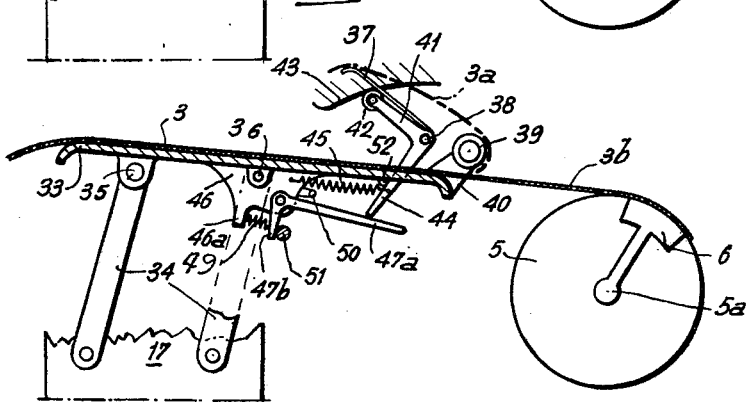

United States Patent Office 3,012,602
Patented Dec. 12, 1961

3,012,602
APPARATUS FOR THE MANUFACTURE OF PNEUMATIC TIRE CASINGS
Noël Nebout, Montluçon, Allier, France, assignor, by mesne assignments, to Dunlop Rubber Company Limited, London, England
Filed Mar. 3, 1958, Ser. No. 718,663
Claims priority, application France Mar. 21, 1957
3 Claims. (Cl. 156—406)

This invention relates to the manufacture of pneumatic tires. In making tire casings, plies of rubberized fabric are wound on a drum, wires are laid along the edges of the plies, the said edges are turned inwards over the wires, sometimes additional plies are applied, and finally the tire tread band is positioned.

The above steps are sometimes carried out manually or they may be performed with semi-automatic machinery which still requires a considerable amount of manual operations that are lengthy, tedious and requires skilled operators. The quality of the finished tire product is not uniform but depends on the skill of the operators.

It is an object of this invention to provide apparatus whereby the major steps in a tire making process will be carried out mechanically and, if desired, in a fully automatic manner so as to increase and improve the output and reduce manufacturing costs.

One of the important aspects of the invention involves the provision of apparatus for applying rubberized fabric plies which will act to position the plies mechanically on the periphery of a cylindrical form or shaping drum, which drum preferably has suction means associated with it acting on the initial ply applied around the drum to retain said ply in position after the leading end of the ply has been applied to the drum.

Further, the ply feeding or distributing means according to this invention essentially comprise a set of shelf-like plates or slides mounted on the drum so as to be movable between an operative position in which their planes are substantially tangential to the drum periphery and a retracted position in which said slides are moved away from the drum periphery.

Each slide carries one end of a strip or band of rubberized fabric or ply, which may be single-fold or manifold as desired, and the respective shelves or slides are alternately moved toward the drum to position the ply and then retracted away from the drum to clear the way for positioning another slide.

Preferably each slide has a flange pivoted to it near the edge of it directed towards the drum about an axis parallel to the drum axis, and said flange is adapted to have the end of a ply folded over it. Means are provided for suddenly releasing the flange as the slide moves toward the drum so that the flange will forcibly apply said end portion of the ply supported on it, against the periphery of the drum. When a desired length of ply has been wound around the drum, the ply is cut off and the free end of the remaining portion is folded down over the flange as the latter is restored to its initial position at the time the associated slide recedes.

Improved apparatus according to the invention may further include any one or more of the following features:

A ply-feeder table unit adapted to receive reels of ply stored thereon;
Means for placing the wires and folding the edges of the ply around them;
Means for positioning the tire tread in register with the drum.
Drive mechanism for the various components of the apparatus including the drum for the performance of the various steps of the process, and preferably a central control or operating station for causing said steps to be performed in sequence in accordance with a predetermined program.

The ensuing description made with reference to the accompanying drawings, given by way of illustration but not of limitation, will provide a clear understanding of the manner in which the invention can be performed.

FIG. 1 is a general schematic view of the machine in plan;
FIG. 2 is a schematic side view showing the feed table and ply-distributor mechanism;
FIG. 3 is a longitudinal section on an enlarged scale showing a slide in retracted position;
FIG. 4 is a similar view showing the slide in operative position.

As shown in FIG. 1 apparatus according to the invention comprises a supply or feed table 1 which may support one or more reels 2 carrying rolls of single or manifold sheets or plies 3 of rubberized fabric. The number of such reels is equal to the number of elementary or constituent layers in each ply and this in turn will depend on the particular type and size of tire being manufactured. The reeling machines used may be similar to the machines described in my co-pending U.S. application Ser. No. 718,662.

Supported on a front end of the table 1 is an applicator device to be later described in detail and which serves to apply the plies 3 to a conventional shaping drum 5 of the collapsible type. The dum 5 includes suction means 6 for detaining an end portion of the initial ply.

The drum 5 is secured on a rotatable shaft 5a which is driven from operating mechanism 7 of generally conventional type not described herein whereby the drum can be rotated to various angular positions in accordance with the various steps of the tire manufacturing process to be performed thereon. On both sides of the drum and spaced therefrom various units of apparatus are provided for performing complementary operations on the plies, including especially a pair of units 8 for positioning the wires and folding the edges of the plies over said wires.

The unit 8 provided on one side of the drum, the right side as shown, is slidably mounted coaxially with the drum shaft 5a and is operated by a fluid-actuator 9 operating between the unit 8 and the frame 10 of the mechanism 7, while the opposite unit 8 is similarly mounted for sliding movement with respect to a frame 11 and is operated by a fluid actuator 9 operating between said frame and the unit. The assembly comprising frame 11 and unit 8 is bodily swingable about a vertical shaft 12 so as to clear the left hand end of the drum to facilitate removal of the finished tire casings.

Positioned on the side of drum 5 remote from table 1 is a table 13, shown as comprising a set of freely journalled rollers, bodily pivotable about a vertical shaft 13b so that said table can either be positioned normally to the drum axis, as shown in solid lines, or at right angles to the position shown, in alignment with a further conveyer table 14 serving to deliver the tire treads as later described. Laterally-spaced longitudinal guides 13a, 14a, the lateral spacing of which is adjustable, extend over the tables 13 and 14 for accurately centering the treads relatively to the vertical midplane M of the drum 5. Stops are provided for retaining the table 13 accurately in each of its positions. Further, an arm 15 having a pair of rollers journalled thereon as shown is provided for assisting in the application of the treads to the plies on the drum.

The unit shown at 16 represents a conventional program control unit for cyclically controlling the steps of the process.

As shown in FIG. 2, the feeder table 1 essentially comprises a frame 17 adapted to receive therein reeling units 2 having the plies 3 stored thereon. As described in my co-pending application Ser. No. 718,662 mentioned above, the reeling units are supported on rollers 18 travelling on rails 19 on the base 20 of the frame 17, so as to enable the reeling units to be correctly positioned with respect to the machine in the transverse direction. In the longitudinal direction correct centering is provided for by means of centering bearing surfaces 21 cooperating with complementary bearing surfaces or abutments 22 on the reeling units, as described in the last-mentioned patent application.

Power take-off means 23 provided on the frame 17 serve to actuate friction rollers 24 journalled on depending arms 25 pivoted to the top of the frame. The friction rollers assist in reeling off the plies from the main drums 2b of the reeling units by acting on a flexible strip 26 which is taken up on the auxiliary drum 2a of the unit as the plies are reeled off the main drum, in a manner described in my afore-mentioned patent application. Further as there described, drive and friction coupling means 27 are mounted on pivoted arms 28. The ply 3 as it issues from the main drum 2b of each unit is advanced by a drive roller 27 engaging the ply and mounted on a pivoted arm 28.

Each ply 3 as it issues from its reeling unit is caused to form a hanging loop 29 serving to take up variations in the relative feed velocities through the system, said loop 29 cooperating with photo-electric control means indicated at 30 arranged to act on the feed rate to maintain the hanging length of the loop substantially constant. Beyond the loop 29 each ply 3 is passed over a related guide roller 31.

As described in my afore-mentioned application Ser. No. 718,662 coupling means are supported from pivoted arms 32 on the frame and are selectively engageable with the drums 2a and 2b of each unit for selectively coupling the drum to driving or braking means. In the present instance the said coupling means are used to apply brake force to the main drum 2b of each unit in order to ensure a smooth and regular reeling operation.

It will be understood that the supply unit 1 here shown as including two reeling units may be made to include a greater number of such units, e.g. four or more, in order to feed a corresponding number of plies simultaneously to the processing drum 5.

Applicator apparatus is mounted on the forward end of the supply unit 1 for applying the plies to the drum 5 and is shown as comprising a set of vertically spaced retractible shelves or slides 33, corresponding in number to the number of plies used and hence to the number of reeling units provided in the supply unit 1. Thus there are two retractible slides 33 in the present embodiment.

Each slide 33 is normally held in a retracted position R shown in full lines in FIG. 2 but can be moved to an operative position T illustrated in chain lines. In its operative position the slide has its top surface extending in substantially tangential relation with the periphery of drum 5 at the top of the drum. The plies 3 are fed from the feed rollers 31 so that the leading end portion of each ply lies over the upper surface of the related slide 33, and generally the arrangement is such that the usual threads extending diagonally across each ply will be angled in opposite directions from each ply to the adjacent one, i.e. in symmetrically crossed relation.

As shown in greater detail in FIGS. 3 and 4 each slide or shelf 33 is pivoted at 35 and 36 to the one ends of links 34 having their other ends pivoted to the frame 17 and reciprocable about their fixed pivots between the retracted position shown in FIG. 3 and the advanced position shown in FIG. 4 to move the slides between their retracted and operative positions respectively. In such movement the planes of the slides remain continually parallel to the axis 5a of the drum 5. It will be understood that instead of the linkages shown other suitable guide means may be used, such as rollers guided in appropriate ways.

Supported near the forward end of each slide 33 in a position spaced above its upper surface is a horizontal pivot shaft 38 on which a plate 37 is pivoted. Supported from the front end of slide 33 between forwardly jutting arms 40 is a horizontal guide roller 39, e.g. of tubular form, which extends parallel to and is spaced forwardly from the pivot shaft 38. The ply 3 extending along the upper surface of the slide 33 has its forward end portion turned upwardly about the guide roller 39 and then folded rearwards to extend over the upper surface of the rearwardly directed plate 37 as shown in FIG. 3. Secured to the pivot 38 is a bell-crank lever 41 having a roller 42 journalled on one of its arms which is adapted to engage a cam surface 43 fixed, through means not shown, to the frame 17 as indicated in FIG. 4. The other arm 44 of the lever 41 has a tension spring 45 attached to it at one end, the other end of the spring being anchored to a bracket 46 projecting from the slide 33. A detent lever 47 pivoted to the bracket 46 has a long arm 47a engageable with the arm 44 of lever 41 and a shorter arm 47b connected by a spring 46a to a projection 46a of bracket 46. A stop 50 serves to limit the angular movement of detent lever 47. FIG. 4 further illustrates an abutment 51 preferably adjustable in position for cooperating with the detent arm 47b.

Lateral guide means, not shown, may be provided on the slides for guiding and centering the plies thereon. The applicator system described operates as follows:

The reeling units 2 are correctly positioned in the frame 17 of the supply unit and are prepared for operation by engaging the rollers 24 and 27 and the coupling means on arm 32. Then a suitable length of ply is reeled off each unit until the ends of the plies extend over the slides 33. The collapsible shaper drum 5 is then brought to its collapsed condition and one of the two wires to be provided in the tire, the right hand wire as shown in FIG. 1, is positioned on the unit 8 by conventional means not shown. The drum 5 is then restored to its operative condition.

The slide 33 receiving the foremost ply 3 is then advanced from its retracted position (FIG. 3) to its operative position (FIG. 4). Towards the end of this movement the detent arm 47b strikes the stop 51 and the detent is rocked so that its arm 47a disengages the arm 44 of lever 41. Lever 41 snaps free under the action of tension spring 45 and rapidly rotates the plate 37 clockwise to its forward position, the rotation being limited by engagement of follower roller 42 with cam surface 43, or if desired by engagement of arm 44 with a stop 52 provided under the slide 33. The sudden clockwise rotation of plate 37 propels the end portion 3a of ply 3 against the drum 5 as shown at 3b in FIG. 4 and the ply immediately adheres to the periphery of the drum due to the action of the suction means 6 associated with said drum.

The drum 5 may then be made to perform one full revolution, while at the same time the drive rollers 24 and 27 are placed in rotation. The initial ply is thus wound about the drum. The ply is then torn or cut off and the cut end thereof is applied over the other end on the drum. The free end of the ply remaining on the shelf is then in turn folded around the plate 37. The slide 33 is then restored to its retracted position of FIG. 3.

During this retracting movement the roller 42 travels over the cam surface 43 and restores the lever 41 and therewith plate 37 and the ply 3 to their initial positions, said lever being then retained in said position by engagement thereof with detent arm 47a since detent arm 47b has not disengaged stop 51.

It is important to note that even should the operator place the extremity 3a of the ply in any haphazard position upon plate 37 the ply will always assume a correct position on the drum as shown at 3b since, owing to the sudden release action of plate 37, end part of the ply will act as if provided with a pivot in snapping from the position shown in FIG. 3 to that shown in FIG. 4. The correct positioning of the ply on the drum is moreover assisted by the fact that the slide is brought to a sudden stop adjacent to the drum (FIG. 4).

The drum is then rotated idly 180° to prevent a coincidence between the joints in the adjacent plies, and the same operation as above described is repeated this time using the ply 3 issuing from the other reeling unit 2 and the other applicator slide or shelf 33.

After the second ply has been applied the wires are positioned on the opposite sides of the drum by means of the wiring devices 8 and the same units are used to fold the plies over the wires.

The apparatus described may further be fitted with reeling means for applying gum-coated bands or strips of rubber to the plies at the joints of the plies on the drum. Such additional reels have not been illustrated for the sake of simplicity.

After the wiring units 8 have been restored to their initial positions, a tire tread band is passed from feeder table 14 to table 3, the table is turned into alignment with the drum 5 (to the full line position in FIG. 1) and the tread is applied to the plies by imparting a full revolution to the drum. The adjacent ends of the tread are bonded together and, using the bonding roller arm 15, said tread is pressed down and firmly bonded to the plies. The tread-bonding device 15, though of a well-known conventional type, may be described as comprising a pair of spaced rollers which in an initial condition are positioned in engagement with each other along the arm 15 and are made to move away from each other as the drum is rotated to bond the tread to the plies throughout the tire circumference.

On completion of the bonding operation described, the frame 11 is swung to its dotted-line position, the shaper drum 5 is collapsed and the completed raw tire casing is removed from the drum for transfer to a curing station.

It will be understood that various changes may be made in the details of embodiment illustrated and described without exceeding the scope of the ensuing claims.

What I claim is:

1. In a tire manufacturing apparatus, a shaper drum, a frame adjacent to said drum and spaced therefrom in a direction normal to the drum axis, a shelf member projecting from said frame towards said drum, means supporting said member for movement relative to the frame between a retracted position and an advanced position with said member positioned adjacent said drum tangentially thereto, means for feeding a tire ply to be supported by said member; a plate pivoted on said member at the end directed towards said drum, for movement about an axis parallel to the axis of said drum, means for locking said plate in a position away from said drum, means for resiliently urging said plate towards said drum and means on said frame for releasing said locking means when said member is moved towards said advanced position, whereby an end portion of said ply, previously bent away from said drum onto said plate may be projected and applied onto said drum.

2. The combination of claim 1 wherein means are provided on said frame for resetting said plate into engagement with said locking means when said member is moved back into said retracted position.

3. In a tire manufacturing apparatus, a shaper drum, a frame adjacent to said drum and spaced therefrom in a direction normal to the drum axis, a shelf member projecting from said frame towards said drum, means supporting said member for movement relative to the frame between a retracted position and an advanced position with said member positioned adjacent said drum tangentially thereto, means for feeding a tire ply to be supported by said member; a pivot shaft journalled on said member above the end of said member directed towards said drum in parallel relationship with the axis of said drum, a plate secured to said pivot shaft, a first bell-crank lever secured to said pivot shaft, a spring attached to one of the arms of said lever and to said member for urging said plate towards said drum, a second bell-crank lever secured to said pivot shaft, a spring attached to one of which is adapted to engage the said arm of said first crank lever for locking said plate in a position away of said drum, a spring for resiliently urging said arm of said second lever towards said arm of said first lever, an abutment on said frame adapted to act onto the second arm of said second lever when said member is moved towards said advanced position for releasing said plate, whereby an end portion of said ply, bent away from said drum onto said plate may be unbent and projected onto said drum, a cam on said frame adapted to be engaged by the second arm of said first bell-crank lever when said member is moved back into said retracted position, for resetting said one arm of said second bell-crank lever into engagement with said one arm of said first crank lever, whereby said plate is locked in said position away from said drum.

References Cited in the file of this patent

UNITED STATES PATENTS

| | | |
|---|---|---|
| 1,266,364 | Wheeler | May 14, 1918 |
| 1,572,011 | Hermann | Feb. 9, 1926 |
| 1,891,273 | Stacey | Dec. 20, 1932 |
| 1,938,787 | Abbott | Dec. 12, 1933 |
| 2,002,970 | Willshaw | May 28, 1935 |
| 2,041,990 | Breth et al. | May 26, 1936 |
| 2,346,439 | Leguillon | Apr. 11, 1944 |
| 2,441,791 | Bostwick | May 18, 1948 |
| 2,664,139 | Speed et al. | Dec. 29, 1953 |
| 2,671,495 | Iredell | Mar. 9, 1954 |
| 2,832,396 | Harris | Apr. 29, 1958 |